(12) United States Patent
Sweatman et al.

(10) Patent No.: US 8,656,995 B2
(45) Date of Patent: Feb. 25, 2014

(54) DETECTING AND CORRECTING UNINTENDED FLUID FLOW BETWEEN SUBTERRANEAN ZONES

(75) Inventors: Ronald E. Sweatman, Montgomery, TX (US); Glenn R. McColpin, Katy, TX (US); Eric J. Davis, El Cerrito, CA (US); Scott D. Marsic, Oakland, CA (US); Etienne M. Samson, Cypress, TX (US)

(73) Assignee: Landmark Graphics Corporation, Houston, TX (US)

( * ) Notice: Subject to any disclaimer, the term of this patent is extended or adjusted under 35 U.S.C. 154(b) by 0 days.

(21) Appl. No.: 13/300,247

(22) Filed: Nov. 18, 2011

(65) Prior Publication Data

US 2012/0061084 A1      Mar. 15, 2012

Related U.S. Application Data

(63) Continuation-in-part of application No. 12/875,235, filed on Sep. 3, 2010, now Pat. No. 8,517,094.

(51) Int. Cl.
  *E21B 47/10*      (2012.01)

(52) U.S. Cl.
  USPC .................................. 166/250.08; 166/305.1

(58) Field of Classification Search
  USPC ......... 166/337, 250.08, 90.1, 305.1, 281, 402
  See application file for complete search history.

(56) References Cited

U.S. PATENT DOCUMENTS

| | | | |
|---|---|---|---|
| 3,003,557 A | | 10/1961 | Huitt et al. |
| 3,199,588 A | * | 8/1965 | Holbert .......................... 166/295 |
| 3,612,608 A | | 10/1971 | Manker et al. |
| 4,809,780 A | | 3/1989 | Shen |
| 5,520,247 A | * | 5/1996 | Meyling et al. ................ 166/245 |
| 5,721,538 A | | 2/1998 | Tubel et al. |
| 5,836,390 A | | 11/1998 | Apps et al. |
| 5,913,364 A | | 6/1999 | Sweatman |
| 5,961,438 A | * | 10/1999 | Ballantine et al. ............ 588/250 |
| 6,060,434 A | | 5/2000 | Sweatman |
| 6,167,967 B1 | | 1/2001 | Sweatman |
| 6,258,757 B1 | | 7/2001 | Sweatman |

(Continued)

FOREIGN PATENT DOCUMENTS

| | | |
|---|---|---|
| WO | 2004-096940 A1 | 11/2004 |
| WO | 2010-057931 A1 | 5/2010 |

OTHER PUBLICATIONS

Clanton, R. "Real-Time Monitoring of Acid Stimulation Using a Fiber-Optic DTS System." SPE 100617 presented at Western Regional / AAPG Pacific Section / GSA Cordilleran Section Joint Meeting, Anchorage, Alaska; May 8-10, 2006.

(Continued)

*Primary Examiner* — Shane Bomar
*Assistant Examiner* — Kipp Wallace
(74) *Attorney, Agent, or Firm* — Bradley Misley; Mark E. Scott; Conley Rose, P.C.

(57) ABSTRACT

Detecting and correcting unintended fluid flow between subterranean zones. At least some of the illustrative embodiments are methods including: injecting a first fluid into a subterranean zone, the injecting by way of a first borehole; making a reading indicative of surface deformation; identifying, based on the reading indicative of surface deformation, a flow path for a second fluid out of the subterranean zone; placing a compound into the flow path, the compound reduces the flow of the second fluid through the flow path.

19 Claims, 10 Drawing Sheets

(56) References Cited

U.S. PATENT DOCUMENTS

| | | | |
|---|---|---|---|
| 6,926,081 | B2 | 8/2005 | Sweatman |
| 7,311,147 | B2 | 12/2007 | Sweatman |
| 7,314,082 | B2* | 1/2008 | Sweatman et al. ......... 166/250.1 |
| 7,768,441 | B2 | 8/2010 | Davis |
| 2001/0045280 | A1 | 11/2001 | Longbottom et al. |
| 2003/0205375 | A1 | 11/2003 | Wright et al. |
| 2004/0163822 | A1 | 8/2004 | Zhang et al. |
| 2004/0206495 | A1 | 10/2004 | Lehman et al. |
| 2005/0115711 | A1 | 6/2005 | Williams et al. |
| 2005/0197777 | A1 | 9/2005 | Rodney et al. |
| 2005/0197781 | A1 | 9/2005 | Harmon et al. |
| 2006/0081412 | A1 | 4/2006 | Wright et al. |
| 2006/0219402 | A1 | 10/2006 | Lecampion et al. |
| 2007/0235181 | A1 | 10/2007 | Lecampion et al. |
| 2009/0052277 | A1* | 2/2009 | Swanson ........................ 367/15 |
| 2009/0065198 | A1 | 3/2009 | Suarez-Rivera et al. |
| 2009/0125280 | A1 | 5/2009 | Soliman et al. |
| 2009/0255670 | A1 | 10/2009 | Koyama et al. |
| 2009/0313772 | A1 | 12/2009 | Talley |
| 2010/0155139 | A1 | 6/2010 | Kuckes |
| 2011/0066380 | A1 | 3/2011 | Hager et al. |
| 2012/0113752 | A1* | 5/2012 | De Paulis et al. ............... 367/88 |

OTHER PUBLICATIONS

Davis, E. "Use of Deformation Based Reservoir Monitoring for Early Warning Leak Detection." Presented at the 2010 International Conference on Greenhouse Gas Technologies (GHGT10) held in RAI Amsterdam, The Netherlands; Sep. 19-23, 2010.

Davis, E. "Precise Tiltmeter Subsidence Monitoring Enhances Reservoir Management." SPE 62577 presented at 2000 SPE/AAPG Western Regional Meeting, Long Beach, California; Jun. 19-23, 2000.

Davis, E. "Precise Deformation Monitoring by High Resolution Tiltmeters." SEGJ. Presented at the 2001 Conference and published in the Butsuri-Tanso, vol. 54, No. 6, pp. 425-432.

Davis, E. "Combining InSAR and GPS for Improved Surface Deformation Monitoring." WHOC 2008-306, presented at the World Heavy Oil Congress, Edmonton, Alberta, Canada; Mar. 10-12, 2008.

Davis, E.J. "Deformation Monitoring Through Multi-Platform Integration." 2008 13th FIG Symposium on Deformation Measurement and Analysis / 4th IAG Symposium on Geodesy for Geotechnical and Structural Engineering, LNEC, Lisbon, Portugal; May 12-15, 2008.

Jones, D.L. "Improved Magnetic Model for Determination of Range and Direction to a Blowout Well." SPE 14388 presented at the 1985 SPE Annual Technical Conference and Exhibition, Las Vegas, Nevada; Sep. 22-25, 1985.

Du, J. "Model Uncertainties and Resolution Studies With Application to Subsurface Movement of a CO2 Injection Project in the Krechba Field Using InSAR Data." Journal of Canadian Petroleum Technology, vol. 49, No. 6; pp. 31-37, Jun. 2010.

Du, J. "Mapping Reservoir Volume Changes During Cyclic Steam Stimulation Using Tilimeter-Based Surface-Deformation Measurements." SPE 97848, Jun. 27, 2007.

Rosen, P.A. "Synthetic Aperture Radar Interferometry." Proceedings of the IEEE, vol. 88, No. 3; Mar. 2000.

Sanad, M. et al. "Numerical Models Help Analyze Lost-Circulation/Flow Events and Frac Gradient Increase to Control an HPHT Well in the East Mediterranean Sea." SPE 87094, presented at the 2004 IADC/SPE Drilling Conference held in Dallas, Texas; Mar. 2004.

Seifert, D.J. "Deep Electrical Images, Geosignal and Real Time Inversion Help Guide Steering Decisions." SPE 123940, presented at the 2009 SPE Annual Technical Conference and Exhibition held in New Orleans, Louisiana; Oct. 4-7, 2009.

Sweatman, R. "New Solutions to Remedy Lost Circulation, Crossflows, and Underground Blowouts." SPE 37671, presented at the 1997 SPE/IADC Drilling Conference held in Amsterdam, The Netherlands; Mar. 4-6, 1997.

Sweatman, R. "Conformance-While-Drilling Technology Proposed to Optimize Drilling and Production." SPE53312, presented at the 1999 SPE 11th Middle East Oil Show and Conference held in Bahrain; Feb. 20-23, 1999.

Sweatman, R. "Monitoring Technology Enables Long-Term CO2 Geosequestration." E&P Magazine; Nov. 2009.

Tarr, B.A. "Use of New Ranging Tool to Position a Vertical Well Adjacent to a Horizontal Well." SPE 20446, presented at the 1990 SPE Annual Technical Conference and Exhibition held in New Orleans, Louisiana; Sep. 20-26, 1990.

Wagner, M.J. "Mission Spotlight: Raising the Radar Bar." Inside the RADARSAT-2 Program. http://www.eijournal.com/RADARSAT-2.asp. Dec. 17, 2007.

Warpinski, N.R. "Improved Microseismic Fracture Mapping Using Perforation Timing Measurements for Velocity Calibration." SPE 84488; Mar. 2005.

Wright, C.A. "Downhole Tiltmeter Fracture Mapping: Finally Measuring Hydraulic Fracture Dimensions." SPE 46194, presented at the 2008 SPE Western Regional Meeting, Bakersfield, California; May 10-13, 2008.

Wright, C.A. "Reorientation of Propped Refracture Treatments in the Lost Hills Field." SPE 27896, Pinnacle Technologies, Long Beach, California; Mar. 22-25, 1984.

Wright, C.A. "Surface Tiltmeter Fracture Mapping Reaches New Depths—10,000 Feet and Beyond?" SPE 39919, presented at the 1998 SPE Rocky Mountain Regional / Low-Permeability Reservoirs Symposium, Denver, Colorado; Apr. 5-8, 1998.

Speiss, F.N. "Precise GPS/Acoustic Positioning of Seafloor Reference Points for Tectonic Studies." Marine Physical Laboratory, Scripps Institution of Oceanography, UCSD; San Diego, California; 1998.

McColpin, G.R. "Surface Deformation Monitoring as a Cost Effective MMV Method." GHGT-9, Energy Procedia, Pinnacle Technologies, Houston, Texas; 2009.

Koperna, G.J. "CO2-ECBM/Storage Activities at the San Juan Basin's Pump Canyon Test Site." SPE 124002, Advanced Resources International, New Orleans, Louisiana; Oct. 4-7, 2009.

Ouidinot, A.Y. "CO2 Injection Performance in the Fruitland Coal Fairway, San Juan Basin; Results of a Field Pilot." SPE 127073, Advanced Resources International, San Diego, California; Nov. 3-4, 2009I.

Koplos, J. et al. "A Review of Injection Well Mechanical Integrity Testing Data and Implications for Geosequestration." !EA Greenhouse Gas R&D Programme, 3rd Well Bore Integrity Network Meeting, Santa Fe, New Mexico; Mar. 12-13, 2007.

Sweatman, R. et al. "New Approach and Technology for CO2 Flow Monitoring and Remediation." SPE 137834, presented at Abu Dhabi International Petroleum Exhibition & Conference held in Abu Dhabi, United Arab Emirates; Nov. 1-4, 2010.

Sweatman, R. et al. "Advancements in Technology and Process Approach Reduce Cost and Increase Performance of CO2 Flow Monitoring and Remediation." SPE 138258, presented at the International Conference on CO2 Capture, Storage, and Utilization held in New Orleans, Louisiana; Nov. 10-12, 2010.

Sweatman, R. et al. "Industry Experience With CO2-Enhanced Oil Recovery Technology." SPE 126446, presented at the 2009 SPE International Conference on CO2 Capture, Storage, and Utilization held in San Diego, California; Nov. 2-4, 2009.

Sweatman, R. et al. "Outlook and Technologies for Offshore CO2 EOR/CCS Projects." OTC-21984-PP, presented at the Offshore Technology Conference held in Houston, Texas; May 2-5, 2011.

Contek Solutions et al. "Summary of Carbon Dioxide Enhanced Oil Recovery (CO2EOR) Injection Well Technology." American Petroleum Institute, Aug. 2007.

Unpublished U.S. Appl. No. 12/956,609, entitled "Evaluating Surface Data," filed Nov. 30, 2010.

International Search Report and Written Opinion issued Feb. 28, 2013 in International Patent Application No. PCT/US2012/064609.

Office Action dated Dec. 18, 2012 in U.S. Appl. No. 12/875,235.

International Search Report and Written Opinion issued Jan. 10, 2012 in International Patent Application No. PCT/US2011/036652.

Notice of Allowance issued Jul. 23, 2013 in U.S. Appl. No. 13/875,235, filed Sep. 3, 2010.

\* cited by examiner

DETECTING AND CORRECTING UNINTENDED FLUID FLOW BETWEEN SUBTERRANEAN ZONES

CROSS-REFERENCE TO RELATED APPLICATIONS

This application is a continuation-in-part of application Ser. No. 12/875,235 filed Sep. 3, 2010, titled "Detecting and correcting unintended fluid flow between subterranean zones", which application is incorporated by reference herein as if reproduced in full below.

BACKGROUND

In the production of hydrocarbons, particularly natural gas, a significant amount of carbon dioxide is also produced from underground formations. The carbon dioxide is separated from the hydrocarbons as part of the refining process. Some of the carbon dioxide is used for other purposes, such as formation fracturing operations and enhanced oil recovery, but the remaining carbon dioxide is disposed of in some fashion. One technique is to inject the carbon dioxide back into an underground formation for permanent storage, known as sequestering. These and other sources of carbon dioxide are also being stored underground to reduce greenhouse gas emissions.

Sequestering carbon dioxide carries a risk that the sequestered carbon dioxide will escape out of the underground formation into other formations, like formations containing drinking water, or escape to the surface. As of the writing of this specification, the inventors are not aware of any sustained instance where sequestered carbon dioxide has escaped to the surface or contaminated a drinking water formation; however, temporary leaks have occurred and any method that could be employed to detect a leak, and stop any such leak, would be beneficial.

BRIEF DESCRIPTION OF THE DRAWINGS

For a detailed description of exemplary embodiments, reference will now be made to the accompanying drawings in which.

NOTATION AND NOMENCLATURE

Figure 1:
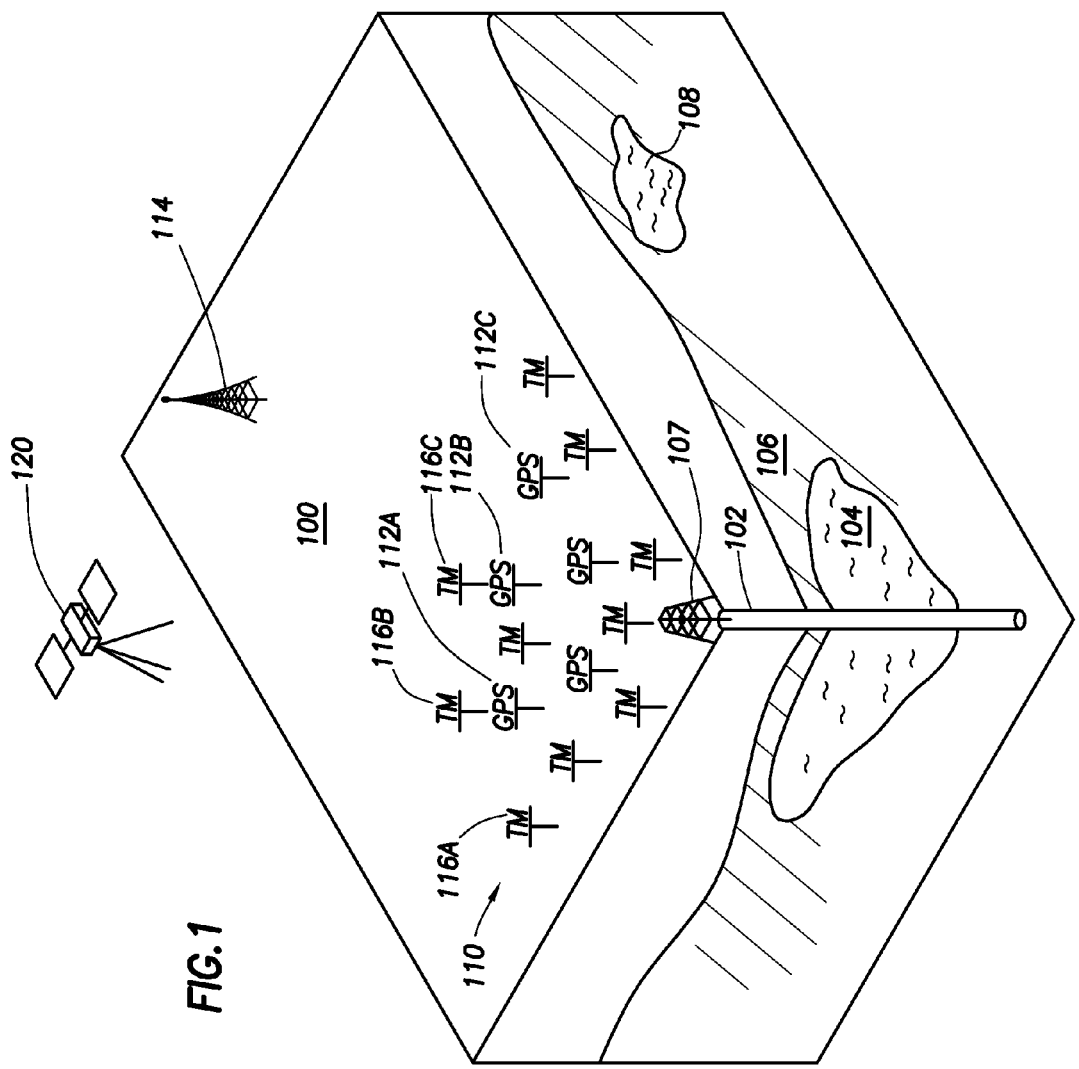
FIG. 1 shows a perspective cut-away view of a plurality of subterranean zones and related monitoring equipment, in accordance with at least some embodiments.

Certain terms are used throughout the following description and claims to refer to particular system components. As one skilled in the art will appreciate, oilfield service companies may refer to a component by different names. This document does not intend to distinguish between components that differ in name but not function.

In the following discussion and in the claims, the terms "including" and "comprising" are used in an open-ended fashion, and thus should be interpreted to mean "including, but not limited to . . . ." Also, the term "couple" or "couples" is intended to mean either an indirect or direct connection. Thus, if a first device couples to a second device, that connection may be through a direct connection or through an indirect connection via other devices and connections.

"Sequestering" shall mean placing in a particular location for storage purposes, but shall not imply a time frame for the storage, nor shall sequestering be obviated by leaks from the particular location.

"Surface" shall mean the outermost portion of the crust of the Earth. Surface shall include not only exposed crust, but "surface" shall also include the seabed and/or the bottom of any body of water.

"Disposed at the seabed", in reference to a measurement device, shall mean that the measurement device resides at a location being between two meters above the seabed and 30 meters below the seabed. "Seabed" shall not speak to the salinity of the water, and even a freshwater lake shall have a "seabed" for purposes of this disclosure and the claims.

"Real-time", with respect to position determinations, shall mean a position determination within 30 seconds or less of a trigger event (e.g., a beginning a software routine that calculates position based on GPS signals).

DETAILED DESCRIPTION

The following discussion is directed to various embodiments of the invention. Although one or more of these embodiments may be preferred, the embodiments disclosed should not be interpreted, or otherwise used, as limiting the scope of the disclosure, including the claims. In addition, one skilled in the art will understand that the following description has broad application, and the discussion of any embodiment is meant only to be exemplary of that embodiment, and not intended to intimate that the scope of the disclosure, including the claims, is limited to that embodiment.

Furthermore, the various embodiments were developed in the context of sequestering carbon dioxide in subterranean zones, and thus the description that follows is based on the developmental context. However, the methods and systems described may be used regardless of the type of fluid injected into a subterranean zone, and regardless of the reason for the injection. For example, the various methods and systems find use in sequestering of other fluids, and find use in injecting for other reasons (e.g., secondary recovery operations), and thus the developmental context shall not be read as a limitation as to the scope of the claims. Moreover, the various techniques are applicable both in land-based operations, as well as offshore operations. So as not to unduly complicate the discussion, the specification first addresses land-based operations, and then specific concepts regarding offshore operations. The application is related to two Society of Petroleum Engineers (SPE) Paper No. 137843 by Ronald Sweatman et al. titled "New Approach and Technology for $CO_2$ Flow Monitoring and Remediation", as well as SPE Paper No. 138258 by Ronald Sweatman et al. also titled "New Approach and Technology for $CO_2$ Flow Monitoring and Remediation." Moreover, the application is related to a Carbon Management Technology Conference (CMTC) Paper No. 150980 by Ronald Sweatman et al. titled "New Technology for Offshore CO2 Reservoir Monitoring and Flow Control."

FIG. 1 shows a perspective cut-away view of a land-based hydrocarbon producing field in order to explain concepts used in the various embodiments. In particular, FIG. 1 shows a section of earth 100 into which a borehole 102 has been drilled. In accordance with at least some embodiments, the borehole 102 is at least partially cased, and a portion of the casing that abuts subterranean zone 104 is perforated to allow fluid communication between the borehole and subterranean zone 104. Although FIG. 1 shows a derrick 107 associated with the borehole 102, in many cases the derrick 107 will have been removed and only a valve stack and related piping will denote the wellhead at the surface.

In some embodiments, the subterranean zone 104 is a zone of porous rock that contains or contained hydrocarbons. Several factors work together to create a subterranean zone, including not only the porous rock, but also a substantially impermeable rock layer 106 capping the zone 104, thus trapping the hydrocarbons within the subterranean zone 104. For that reason, in some cases the rock layer 106 is referred to as a "cap rock" layer. Illustrative FIG. 1 also shows a second subterranean zone 108 which may be capped by the same or a different cap rock layer. The importance of the second subterranean zone 108 will be discussed in relation to unintended flow paths out of illustrative subterranean zone 104, which may also be referred to as leaks, the discussion in greater detail below.

When fluids such as hydrocarbons are removed from a subterranean zone, slight surface deformation may take place, and in particular subsidence. Conversely, when fluids are injected into a subterranean zone, slight surface deformation may take place, and in particular surface swelling or rising. Surface deformation responsive to injecting of fluids into illustrative subterranean zone 104 is in most cases linearly proportional to the volume of fluid injected and inversely proportional to approximately the square of the depth. Different types of rock formations may have greater or lesser response to injected fluids. Given the depth of most subterranean zones in which carbon dioxide may be sequestered, even for high volumes of injected carbon dioxide the amount of surface deformation may be on the centimeter scale, and in many cases on the millimeter scale or smaller.

In accordance with the various embodiments, at or near the surface 110 resides a plurality of illustrative devices used to detect surface deformation. For example, the illustrative system of FIG. 1 shows a plurality of deformation measurement devices 112 (three such devices labeled 112A, 112B and 112C, but additional devices shown but not numbered) in the form of Global Positioning System (GPS) based measurements. The GPS-based measurement devices 112 make elevation measurements based on signals from a constellation of satellites that orbit the earth. In many cases, calculating absolute elevation based on signals from GPS satellites alone will not result in elevation calculations to the centimeter or millimeter scale. Thus, in accordance with at least some embodiments the illustrative deformation measurement devices 112 also use signals from a comparative surface-based station 114, which enables differential GPS-based deformation measurements to the centimeter and/or millimeter scale, and in some cases with accuracies of two millimeters or less.

Still referring to FIG. 1, the illustrative system of FIG. 1 also shows a plurality of deformation measurement devices 116 (three such devices labeled 116A, 116B and 116C, but additional devices shown but not numbered) in the form of inclinometer-based measurements (labeled TM for "tilt meter") placed proximate to the surface. The inclinometer-based measurements may be made at the surface in some cases, and in yet other cases the measurement devices 116 may be placed within 6 to 12 meters of the surface (yet still be considered proximate to the surface). The inclinometer-based devices 116 do not measure absolute elevation, but instead, when multiple measurements are made over time, provide an indication of changes in tilt or incline of the sensor. If the sensor is permanently or semi-permanently coupled at or near the surface of the earth, then indications of tilt or incline of the earth's surface may be made. Inclinometer-based devices have resolutions that can detect changes in inclination when surface deformations are much smaller than the millimeter scale, and in particular in some cases the inclinometer-based measurements are made with resolutions to 0.00000005 degrees.

Inclinometer-based readings provide high precision and accuracy over short periods of time extending to several months, but with current technology and deployment cannot provide high accuracy over significantly longer periods. Thus in some embodiments the GPS-based deformation measurement devices are combined with inclinometer-based measurement devices such that high accuracy is maintained over periods of time exceeding several months.

FIG. 1 further illustrates a satellite 120. In accordance with yet further embodiments, satellite 120 is used to take interferometric synthetic aperture radar (InSAR) measurements of surface deformation over the subterranean zone 104. While FIG. 1 illustrates the InSAR measurements by way of a satellite, in other embodiments InSAR may be taken from airplane-based platforms, tower-mounted stations or stations that take advantage of natural terrain features to provide a direct view of the ground surface under study. InSAR measurements perform centimeter scale or better measurements of change in elevation. In some cases, such as the RADARSAT-2 SAR platform, InSAR can have a three meter pixel size, and a single set of synthetic aperture readings may cover an area of up to 100 kilometers by 100 kilometers. Larger images may be made by splicing together multiple sets of readings. The power of InSAR is determining a change in surface deformation, where a first SAR measurement is taken, and some time later (in accordance with the various embodiments hours or days), a second SAR measurement is taken. Though InSAR cannot determine actual elevation, changes in elevation between measurements can be very accurately determined, including changes in elevation on the millimeter scale. In some embodiments, permanent or semi-permanent reflectors may be placed to help ensure good InSAR readings (such as when surface vegetation covers the area or changes, or where the area is subject to snow accumulations).

GPS-based measurements, inclinometer-based measurements, and InSAR-based measurements are used in the related-art, but for a different purpose than in the various embodiments. In particular, for some hydrocarbon producing underground formations, a secondary recovery technique is used whereby steam is injected into the formation through one borehole in an attempt to increase hydrocarbon production (usually oil) from the same or a second borehole in relatively close proximity. However, because of the nature of the well construction and formation in which steam injection as a secondary recovery technique is used, the steam occasionally finds its way to the surface. In the related-art, one or a combination of the GPS-based measurements, inclinometer-based measurements, and InSAR-based measurements are used to predict locations where secondary recovery steam is about to break the surface, and to determine from which borehole the steam was injected. As mentioned above, the amount of surface deformation is approximately inversely proportional to the square of the depth, and thus the amount of localized deformation for steam close enough to break the surface is relatively high compared to surface deformation associated with a deep subterranean zone. Moreover, the techniques related to surface deformation are used to trace the steam back to the steam injection borehole, such that the steam injection can be stopped and/or the borehole permanently shut in. An illustrative service provider for providing GPS-based measurements, inclinometer-based measurements and/or InSAR-based measures is the PINNACLE™ brand service provided by Halliburton Energy Services, Inc, of Houston, Tex.

It is noted that one of ordinary skill in the art is aware of the GPS-based measurements, inclinometer-based measurements, and InSAR-based measurements (in the context noted in the immediately preceding paragraph), and thus so as not to unduly complicate this description and to avoid obscuring the various embodiments, a more detailed discussion of each measurement technology is omitted.

Figure 2:
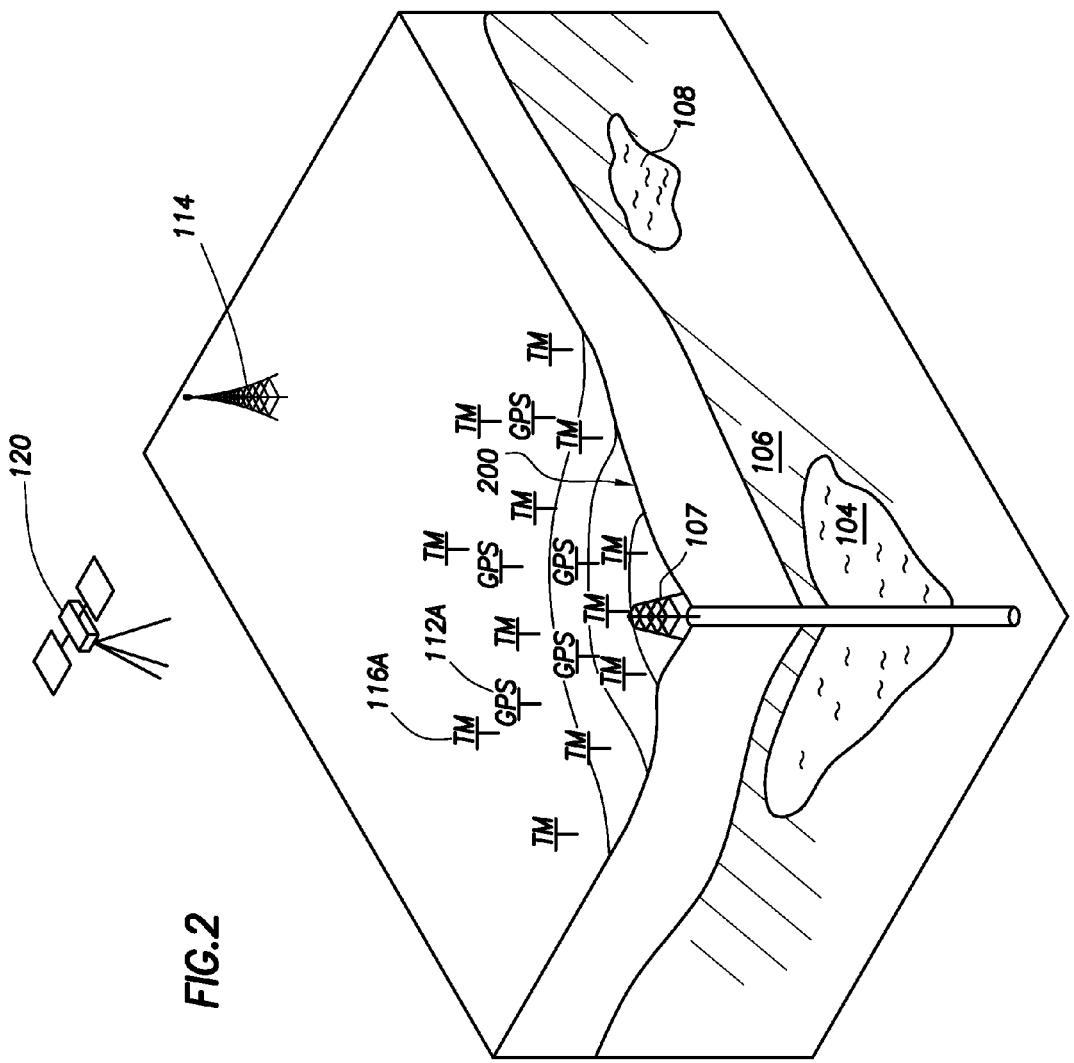
FIG. 2 shows a perspective cut-away view of a plurality of subterranean zones and related monitoring equipment after injection of a fluid in one of the subterranean zones, in accordance with at least some embodiments.

Now consider the situation where illustrative carbon dioxide is pumped or injected into the subterranean zone 104. In most situations, the carbon dioxide is under sufficient pressure to be a super-critical fluid, but having the carbon dioxide in this phase is not required. The additional volume in the subterranean zone 104 creates a surface deformation 200 as illustrated in FIG. 2. The deformation 200 illustrated in FIG. 2 is greatly exaggerated for purposes of clarity. Again, in most case the amount of surface deformation will be a centimeter or less, and in many cases the surface deformation will be merely a few millimeters. Nevertheless, in accordance with the various embodiments a surface deformation reading is made during and/or after the carbon dioxide is injected, the surface deformation reading by one or more of GPS-based measurements, inclinometer-based measurements, InSAR-based measurements, and/or any other technology that directly or indirectly measures surface deformation. In the illustrative case of FIG. 2, the sequestered carbon dioxide is fully contained within the subterranean zone 104.

However, for a variety of reasons, the sequestered carbon dioxide may escape or leak from the subterranean zone 104. The leak creates a flow path for fluids out of the subterranean zone 104. The fluid that leaks from a subterranean zone may be different in each situation. If the leak path is on the fringes of the subterranean zone relatively far from the injection point of the carbon dioxide, the leaking fluid may be a constituent fluid of the subterranean zone, such as hydrocarbons or water. On the other hand, if the leak is near the injection point, or substantially all the hydrocarbons have been removed from the subterranean zone, then the leaking fluid may be the sequestered carbon dioxide. Yet further still, depending on how long the leak occurs, the leaking fluid may change from a constituent fluid of the subterranean zone to carbon dioxide.

Figure 3:
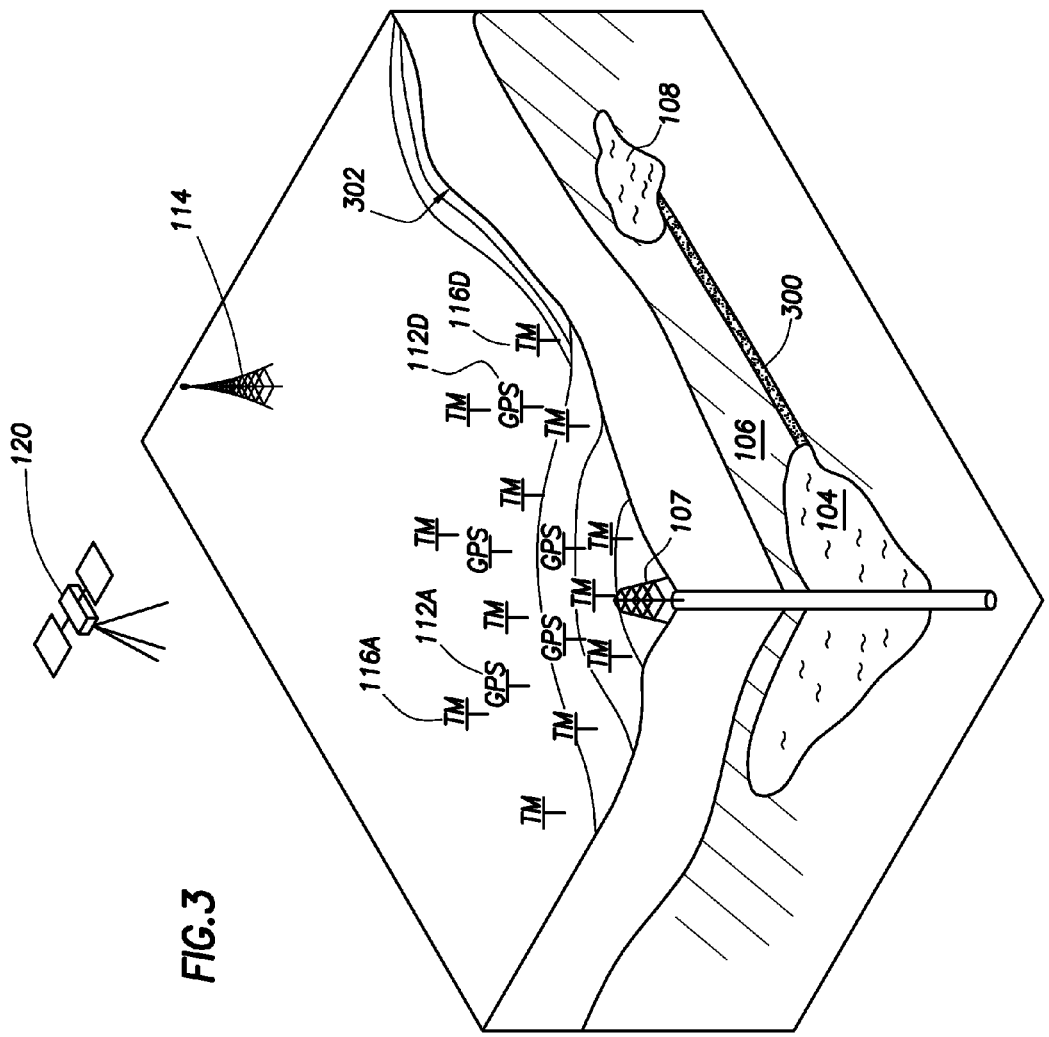
FIG. 3 shows a perspective cut-away view of a plurality of subterranean zones and related monitoring equipment after a leak has formed between the subterranean zones, in accordance with at least some embodiments.

In accordance with the various embodiments, the surface deformation readings are used to determine whether there is a leak of the sequestered fluid out of the subterranean zone 104. With respect to determining whether sequestered fluid is or has escaped, consider FIG. 3. In particular, FIG. 3 illustrates a situation where a flow path 300 develops between the illustrative subterranean zone 104 and illustrative subterranean zone 108. There may be a variety of reasons for a leak between subterranean zones. For example, the sub-surface deformation caused by the increased volume of fluids by sequestering in a subterranean zone may cause flow pathways to open in poorly sealed wells or between layers of rock that were previously sealed by the great weight above the layers. Moreover, such subsurface deformation may cause cracking and fissures to form, which then may open flow paths between the subterranean zones. Yet further still, natural geological faults may be pre-existing between the subterranean zones, and increased pressures within the first subterranean zone may force fluids along the pre-existing geological fault.

Making a determination that the subterranean zone is developing or has developed a leak may take many forms depending on the particular situation. For example, after a sufficient amount of fluid has leaked from the subterranean zone 104, the surface deformation readings over the subterranean zone 104 may show subsidence. Such subsidence after swelling that corresponds with injection of the sequestered fluid may be indicative of a leak. Likewise, in some cases the fluid wave front moving through flow path 300 may itself cause surface deformation that is detectable, such as by illustrative GPS-based measurement station 112D, inclinometer-based measurement station 116D, or InSAR-based measurements scanning areas beyond the surface above the subterranean zone 104. Yet further still, the fluid moving into subterranean zone 108 may cause surface deformation 302, which may be detected by ground-based measurement devices (if present), or InSAR-based measurements scanning areas beyond the surface above the subterranean zone 104.

The frequency of measurement of surface deformation may differ for each circumstance. For example, in cases where a leak is unlikely, inclinometer-based measurements may be taken only every few weeks or months; however, once any measurement system gives an indication that a leak has developed or may be developing, the frequency of some or all the measurements may increase. In some cases, when checking for a leak from a subterranean zone, inclinometer-based measurements and GPS-based measurements may be taken every hour. Greater or lesser time intervals for measurements may be equivalently used, but such intervals are still more frequent than surface-based observations used for other systems (such as to monitor secondary recovery injection fluids). A risk assessment is used to determine the initial time intervals where a high risk situation requires a higher frequency of measurements, and vice-versa.

Regardless of the precise mechanism by which the leak is detected, in most cases the general direction of the leak will be known based on the detection of the leak, or the direction of the leak could be solidified by further measurements (e.g., installing and/or activating additional ground-based measurement stations, expanding the sweep area of the InSAR-based measurements). In some cases, knowing the general direction of the leak may directly indicate the flow path for the leak, for example knowing the general leak direction in combination with existing seismic data may directly indicate the flow path as being along a known geological fault.

Once a leak has been detected, remediating the leak may take many forms depending on the particular situation. Consider, for example, a situation illustrated by FIG. 4. In particular, consider that borehole 102 associated with subterranean zone 104 is used as the injection point for secondary recovery fluids associated with producing borehole 400. For example, the operator may inject carbon dioxide or water into the subterranean zone 104 by way of borehole 102 in an attempt to increase the hydrocarbon production from borehole 400. Further consider that borehole 402 associated with subterranean zone 108 is likewise a hydrocarbon producing borehole, but the operator does not want the secondary recovery fluid injected at borehole 102 to affect borehole 402. Finally, consider that a leak through flow path 300 has developed.

Figure 4:
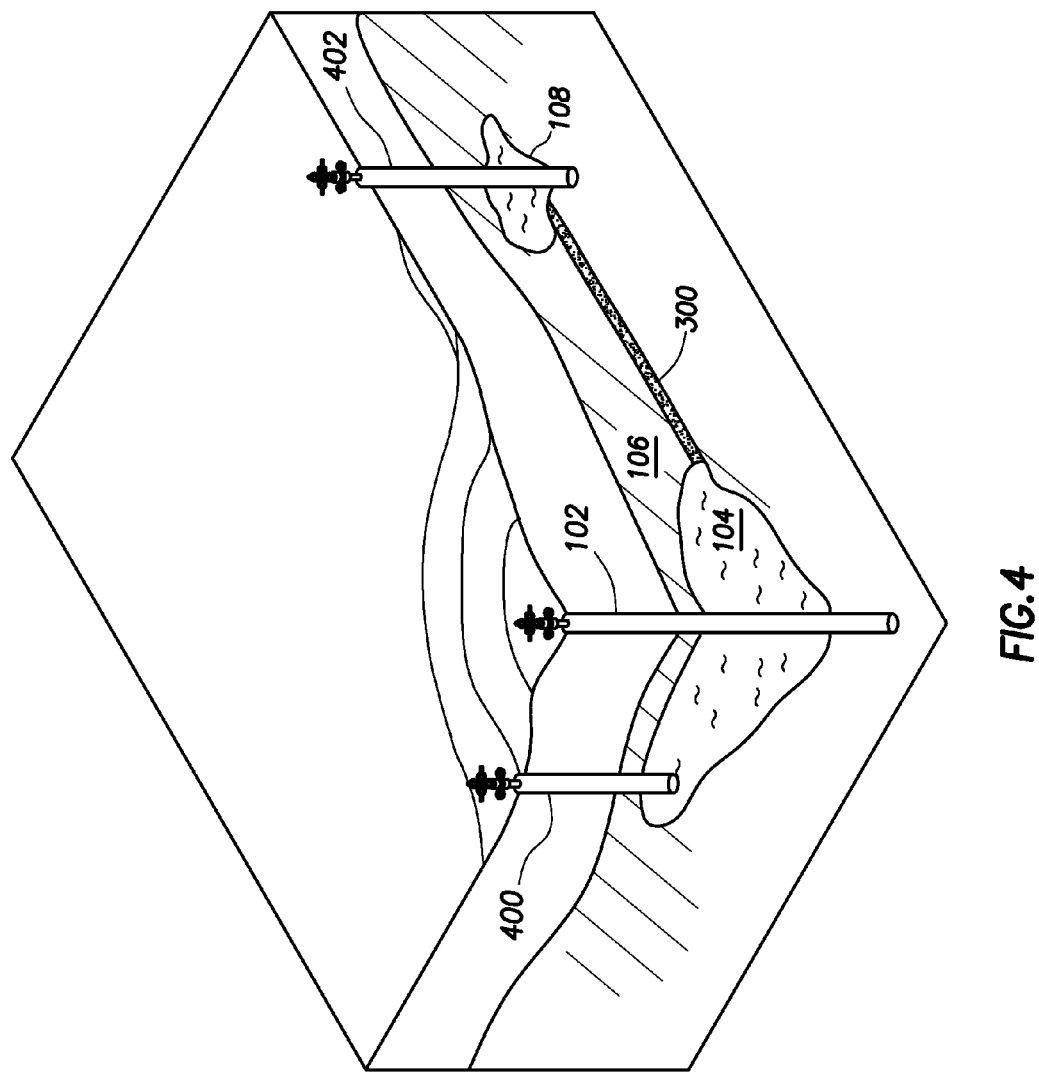
FIG. 4 shows a perspective cut-away view of a plurality of subterranean zones to discuss remediation through existing boreholes, in accordance with at least some embodiments.

In the illustrative situation of FIG. 4, remediating the leak may take many forms. In some embodiments, the operator may utilize any of a variety of sealants or flow modifying compounds injected through either the borehole 102 or the "bullheaded" through production piping associated with borehole 402. For example, the operator may inject a flow a compound into borehole 102, where the flow modifying compound selected is configured to chemically react upon contact with the hydrocarbons associated with subterranean zone 108. Thus, as the injected compound moves along the flow pathway 300, at some point the compound chemically contacts the fluids associated with the subterranean zone 108 and a chemical reaction takes place, which chemical reaction reduces and/or seals the flow along the flow pathway 300.

In yet still other cases, the compound may be selected to chemically react with the fluid in the subterranean zone 104 and may be injected through borehole 402 (e.g., "bullheaded" through production tubing). As the compound migrates toward the leak flow path 300 (and in this example a "reverse" flow), the compound contacts the fluid associated with subterranean zone and chemically reacts, which chemical reaction reduces and/or seals the flow along the flow pathway 300. In yet still other cases, the compound selected and pumped into a borehole may be chemically reactive with the fluid in the associated subterranean zone, but may be buffered with other fluids to ensure that compound reaches the leak flow path. In yet still other cases, the compound selected may be "self" activated in the sense that the compound, when triggered, has a slow moving chemical reaction timed to finalize or complete when the compound reaches the leak flow pathway 300.

Regardless of the borehole into which the compounds are injected with a goal toward reducing the flow through or sealing the leak flow pathway 300, the chemical reactions themselves may likewise take many forms. In some cases, reducing the flow or sealing the leak flow pathway may be "mechanical" in the sense that the compound in the leak flow pathway 300, partially or fully physically blocks the leak flow pathway 300. For example, in the illustrative case of contact with carbon dioxide being the trigger, one may send a latex- or a silicate/polymer-based sealant that converts from a pumpable liquid to an un-pumpable rigid or semi-rigid sealant. In the illustrative case of contact with water being the trigger, the compound may comprise a micro-fine Portland cement mixed in a non-aqueous carrier fluid (e.g., diesel, mineral oil, or synthetic oil) with surfactants. Thus, when the compound contacts water, the cement chemically reacts and hardens in place, reducing the flow or sealing the leak flow pathway. Stated otherwise, the compound viscosifies into a reduced permeability mass.

Further with respect to "mechanical" compounds, now consider a situation where the fluid escaping along the flow path 300 is hydrocarbon. In such an illustrative situation, the compound placed in the flow path 300 may be an organophyllic, micro-fine clay suspended in a water-based fluid. While suspended in the water-based fluid, the clay lodges in the cracks and fissures that define the flow path 300. However, when the hydrocarbons displace the water that suspended the clay, the clay absorbs hydrocarbons and swells, thus further reducing the escape of hydrocarbons along the flow path 300.

Thus, the compound placed in the flow path 300 may comprise a particulate material such as cement, sand, silica flour, gilsonite, graphite; fibrous materials, flaky materials, granular materials or combinations thereof; polymeric materials, a water-soluble material such as a starch, a starch mixture, a pregelatinized starch, a chemically modified starch, a naturally occurring starch or combinations thereof; a hydrophobically modified polymer; or combinations thereof.

In other cases, however, reducing the flow or sealing the leak flow pathway may be "chemical" in the sense that the compound alters the molecular interactions between the rock and the fluids. For example, most hydrocarbon producing subterranean zones are "water wet", meaning that there is little or no affinity for the molecular interactions between elements of the hydrocarbon and elements of the surrounding rock, thus enabling movement of hydrocarbons through pore spaces and stress fractures (keeping in mind in many cases the pore spaces and stress fractures are micron scale features). However, using any of a variety of related-art chemical compounds, it is possible to change the "wetting" of a rock formation to "oil wet", meaning the molecules of the formation have an affinity for (attract and hold) hydrocarbon molecules, thus reducing or eliminating the ability of the hydrocarbon molecules to move through the pore spaces and stress fractures. The reverse situation is also possible—changing an "oil wet" formation to a "water wet" formation. Abstracting the "chemical" remediating concept slightly, it is possible to chemically alter the relative permeability of an earth formation, and such altering of the relative permeability may be used to reduce the flow through or seal the leak flow pathway 300.

Two points are in order before proceeding. First, one of ordinary skill in the art is aware of various types compounds discussed, and thus so as not to unduly complicate this description and to avoid obscuring the various embodiments, a more detailed discussion of each category of sealing compound is omitted. Secondly, while one of ordinary skill may be aware of such technologies, to the knowledge of the inventors herein, use of such technologies has been as a mechanism to prevent loss of drilling fluid into formations penetrated by a borehole, not with respect to reducing or stopping a leak along a flow path 300 between subterranean zones. In the context of preventing loss of drilling fluid into formations, some commercially available sealing compounds comprise FLEXPLUG® W (for formations containing water), FLEXPLUG® OBM (for formations containing hydrocarbons), and FLEXPLUG® R (for formations containing water and/or dry gas flows), all available from Halliburton Energy Services, Inc., of Houston, Tex.

Figure 5:
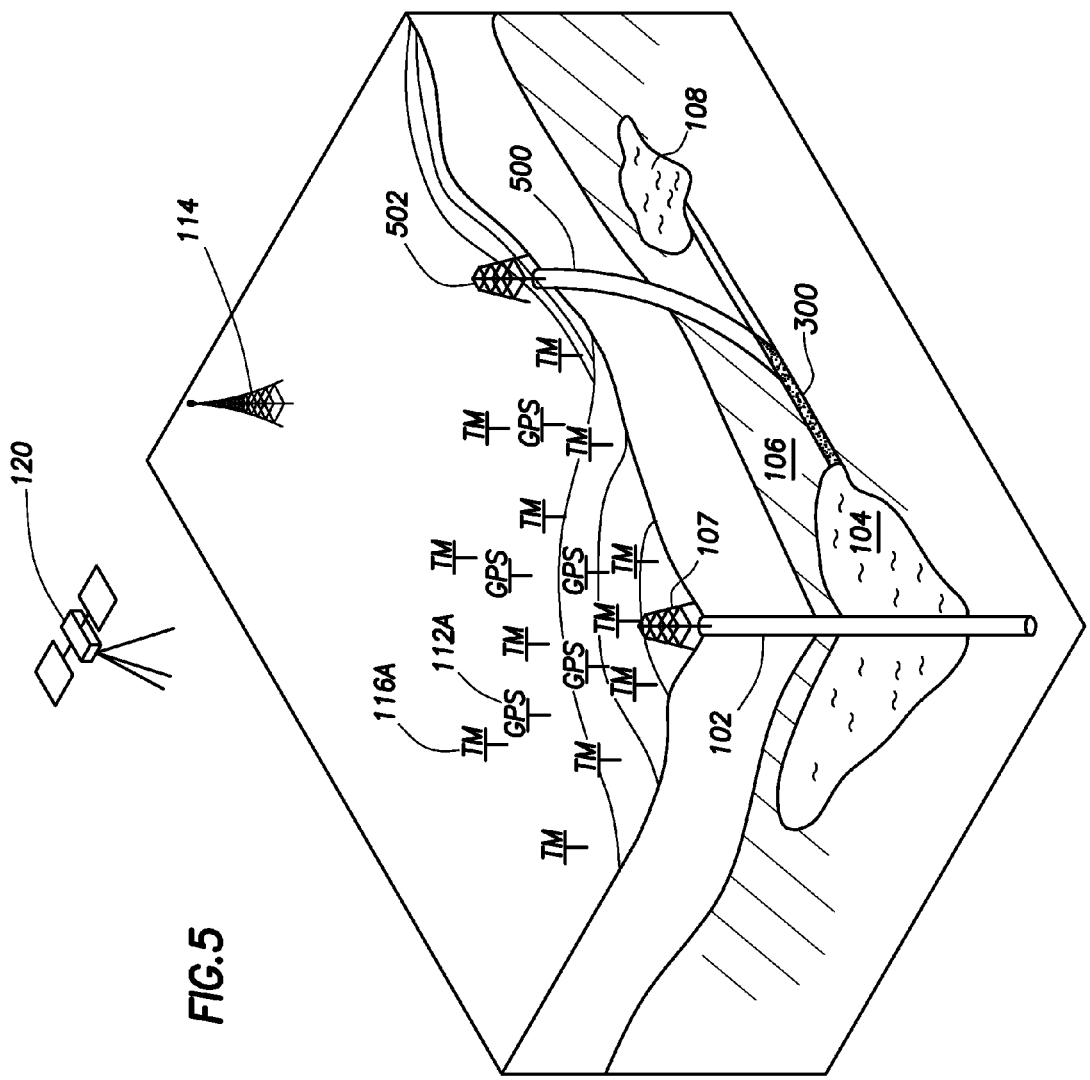
FIG. 5 shows a perspective cut-away view of a plurality of subterranean zones and related monitoring equipment after the flow path of the leak has been intercepted by a borehole, in accordance with at least some embodiments.

The various embodiments discussed to this point have assumed the compound used to remediate the leak flow path 300 is injected through an existing borehole. However, in yet still other cases, placing the compound used to reduce the flow through or seal the leak flow pathway 300 may be more direct. FIG. 5 shows a system in accordance with the alternative embodiments where a borehole is drilled to intersect the flow path 300 of the leak. FIG. 5 illustrative shows the second borehole 500 drilled from a derrick 502. However, the presence of derrick 502 in illustrative FIG. 5 should not imply that the drilling of the borehole 500 must be drilled by conventional techniques. Any suitable drilling system and method may be used to create the second borehole 500, such as drilling based on coiled tubing using a downhole "tractor". Moreover, illustrative FIG. 5 shows the second borehole 500 to be completely distinct from other boreholes (e.g., borehole 102); however, in at least some embodiments the second borehole 500 may be a branch borehole of the borehole through which the sequestered fluid is injected into the subterranean zone 104, or any other borehole including other injection/producing boreholes, as well as monitor boreholes in the vicinity. Finally, in illustrative FIG. 5, the second borehole 500 turns toward subterranean zone 104 to intersect the leak flow path 300, but such is not required. The second borehole 500 may equivalently turn toward the subterranean zone 108, or in some cases intersection the flow path 300 of the leak at or near right angles to the direction of fluid flow within the flow path 300.

In accordance with at least some embodiments, the location of the flow path 300 of the leak may be known in a general sense, but the precise location may not be known or determinable from the surface deformation measurements. In such cases, the drilling of the second borehole may begin initially in the direction indicated by the surface deformation measurements, but refining the drilling direction to ensure intersection with the flow path 300 of the leak may be made by tools disposed within the second borehole 500. In particular, FIG. 5 shows a drilling system 600 that comprises drill string 602 having a drill bit 604 on a distal end thereof. Rotary motion of the drill bit 604, either caused by surface equipment 606 or by a downhole motor, creates the second borehole 500. In accordance with the illustrated embodiments, the drill string 602 comprises a downhole tool 608, the downhole tool in most cases relative close to the drill bit 604. The downhole tool 608 takes measurements with the drill string 502 within the second borehole 500, and in many cases the measurements may be made while drilling is taking place. Thus, downhole tool 608 may be referred to as a logging-while-drilling (LWD) or measuring-while-drilling (MWD) tool. Some in the industry assign distinctions between LWD and MWD, with LWD in most cases referring to measuring of properties of the formations surrounding the borehole, and MWD in most cases referring to measuring properties associated with the borehole itself or the drilling process (e.g., inclination of the borehole, downhole pressure of the drilling fluid, temperature). However, the terms are often used interchangeably, and for the balance of this discussion the term LWD will be used with the understanding that LWD also refers to MWD measurements.

In accordance with a particular embodiment, the drilling direction for the second borehole 500 is refined during drilling by use of LWD measurements of illustrative downhole tool 608. The type of downhole tool 608 used varies depending on the particular situation and the type of fluid moving along the leak flow path 300. In most cases, however, the downhole tool 608 is used to detect contrast between properties of a rock formation in a volume 610 around the tool, where the contrast is with respect to properties of rock formations where the fluid is moving compared to rock formation free from the escaping fluid. There are a myriad of possible situations, and rather than attempt to define each possible situation, the specification gives a brief overview of several different types of downhole tools that may be used.

One type of downhole tool 608 that may be used falls in the class of tools known as "acoustic" tools. Acoustic tools emit an acoustic signal that propagates through the surrounding formation. In many cases the acoustic signal is in the high audible range and above. The acoustic tool also has one or more "listening" devices that detect portions of the acoustic signal as the signal propagates through the formation. Acoustic tools in many cases produce an indication of the speed of sound within the rock formations, and also in many cases the speed of sound measurement is azimuthally sensitive (i.e., directional in relation to the rotation of the tool within the borehole). Thus, in combination with a tool that determines or measures the rotational orientation of the tool, an acoustic tool could identify the relative direction and/or proximity to the flow path 300 of the leak based on changes in speed of sound measured as a function of rotational orientation of the drill string. For example, as the drill bit approaches a rock boundary location where the lower rock formation contains the leak flow path 300, the acoustic tool may identify the boundary based on sensed changes in speed of sound at particular rotational orientations of the tool. A variation of the an acoustic tool is called a "noise log" where the tool does not send out acoustic signals and only has sensitive listening devices to hear the sounds made by dynamic flows in the surrounding rock formations. In practice, this type of tool is coupled to a rotational orientation device to find the direction to the source of the flow-induced sounds. Some directional-sensing noise logging tools can detect ultra-sonic sound waves caused by leaking fluids at various distances away from the tool inside the surrounding rock and behind multiple casing strings. Example noise logging tools are manufactured by Seawell which are run in wells by Halliburton Energy Services, Inc., of Houston, Tex.

Another illustrative type of downhole tool 608 that may be used falls within the class of tools termed induction or electromagnetic (EM) tools. EM tools launch or release electromagnetic waves that propagate through the formation. Portions of the electromagnetic waves are detected by sensors, and based on the amplitude or phase of the detected electromagnetic waves a variety of formation properties can be determined, such as resistivity (and inversely conductivity). In many cases the EM tools are azimuthally sensitive, and thus may detect approaching bed boundaries (such as an approaching flow path 300) based on the contrast in azimuthally sensitive conductivity readings above and below the tool.

Another illustrative type of downhole tool 608 that may be used falls within the class of tools termed conduction tools. Conduction tools create voltage potential that causes electrical current to flow from the tool, through the formation and back to the tool. Based on the electrical properties to induce a particular electrical current flow, attenuation of the current as the current flows through the formation, and phase shift of the current as the current flows through the formation, a variety of formation properties may be determined, such as resistivity (and inversely conductivity). In many cases the conduction tools are azimuthally sensitive, and thus may detect approaching bed boundaries (such as an approaching flow path 300) based on the contrast in azimuthally sensitive conductivity readings above and below the tool.

Two points are in order before proceeding. First, one of ordinary skill in the art is aware the various types of logging tools, and thus so as not to unduly complicate this description and to avoid obscuring the various embodiments, a more detailed discussion of logging tools is omitted. Secondly, while one of ordinary skill may be aware of such technologies, to the knowledge of the inventors herein, use of such technologies has not been with respect to intersecting a flow path 300 of a leak between subterranean zones, or intersecting with the ultimate goal of remediating the leak through the flow path. An illustrative set of logging tools that may be used comprises EWR®-PHASE 4 resistivity measurements, InSite ADR™ Azimuthal Deep Resistivity, InSite AFR™

Azimuthal Focused Resistivity, M5™ Integrated LWD, all available from Halliburton Energy Services, Inc., of Houston, Tex.

Moreover, while the specification highlights three broad categories of logging tools, many variations of the three broad categories are possible, and the high level descriptions should not be read as a limitation as to the configuration of tools that may be selected to help refine the drilling direction to ensure the second borehole 500 intersects the flow path 300. For example, some conduction tools may be self contained a short distance from the drill bit, while other conduction systems utilize the drill bit itself as the launch location for electrical current, thus focusing the conduction-based measurement more along the drilling direction. Moreover, the depth of measurement of each tool changes as a function of the tool type and particular tool configuration. Thus, in refining the drilling direction multiple tools may be used, first using a tool that interrogates a larger volume 610 of the formation surrounding the borehole 500 (but in most cases with lower spatial resolution for data obtained), then using a tool that interrogates a smaller volume 610 of the formation surrounding the borehole 500 (but with higher spatial resolution of the data), and so on. Further still, multiple tools, including tools of varying operational type, may be simultaneously used to help refine the drilling direction.

Figure 6:
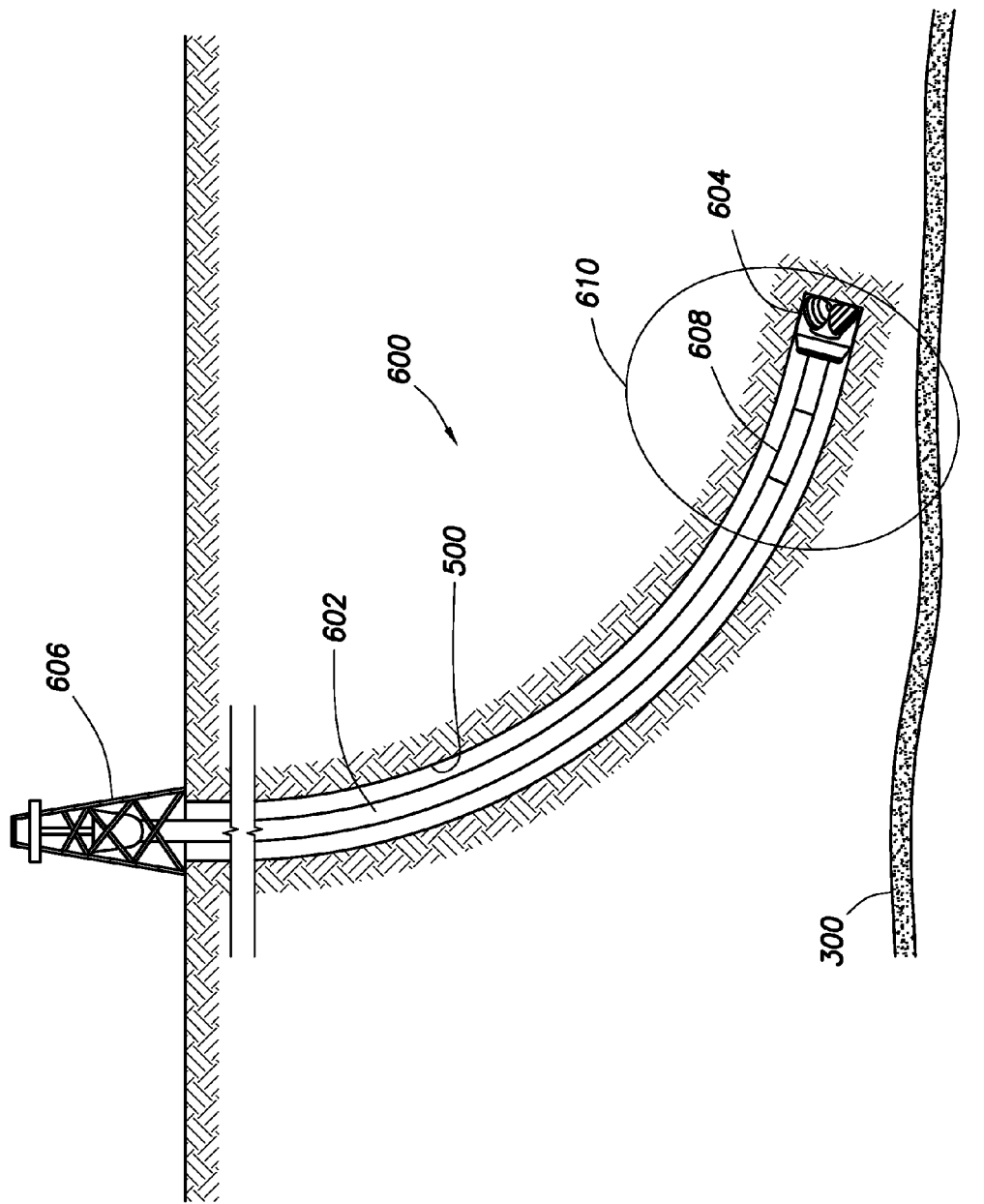
FIG. 6 shows a drilling system to intersect a flow path, in accordance with at least some embodiments.
Figure 7:
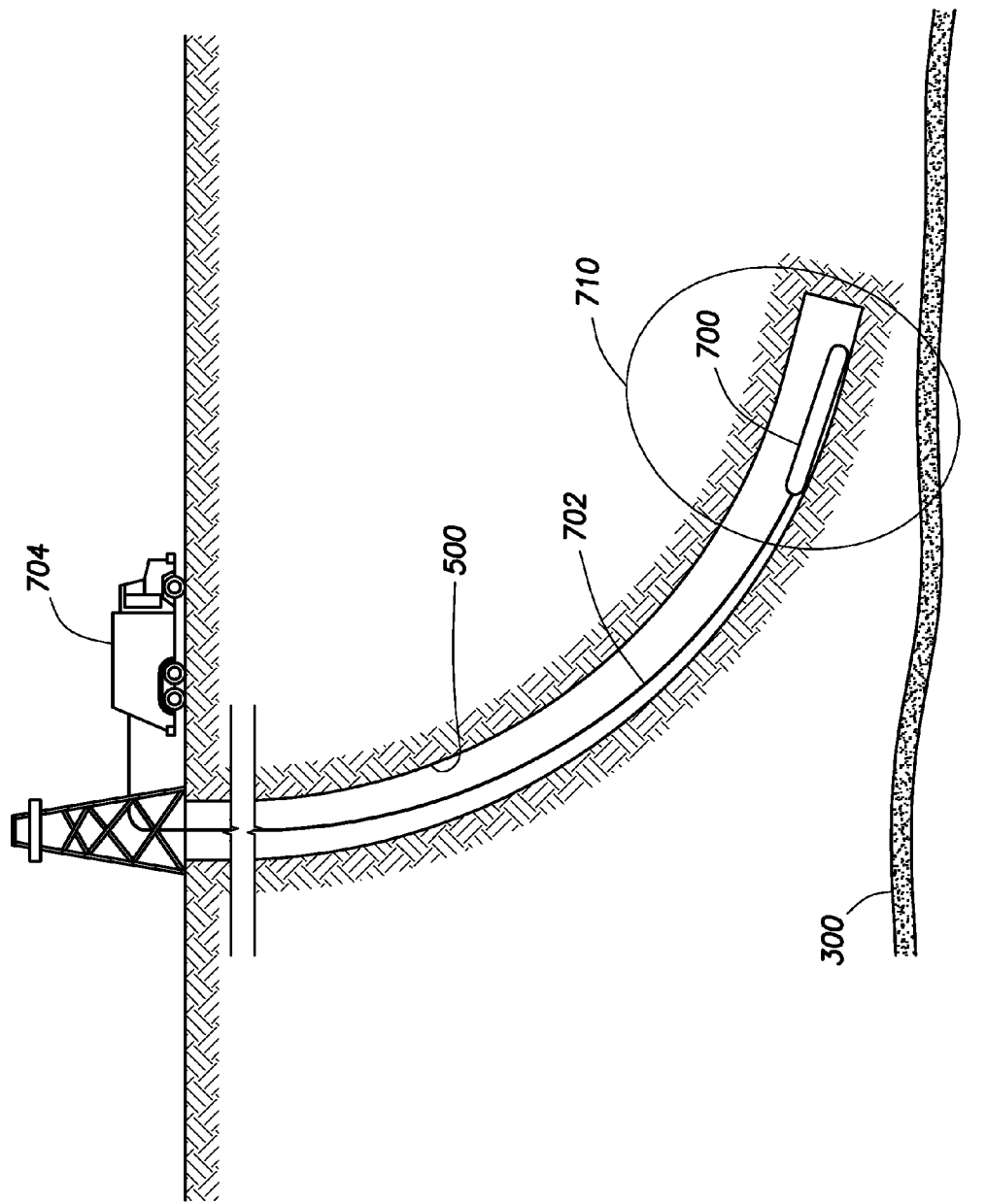
FIG. 7 shows a wireline logging system used to help intersect a flow path, in accordance with at least some embodiments.

The various embodiments to this point have described the refining of the drilling direction in a LWD sense; however, the refining of the drilling direction need not be limited to LWD tools. FIG. 6 shows other embodiments where the downhole tool used to refine the drilling direction is a wireline tool 700. In particular, in the situation illustrated by FIG. 7 the drill string has been removed or "tripped" from the borehole 500, and a tool 700 lowered into the borehole 500. The tool 700 comprises a pressure vessel within which various sensors and electronic devices are placed, and the tool is suspended within the borehole by a wireline or cable. Where the borehole 500 has a horizontal portion, it may be difficult to move the tool 700 into the horizontal portions; and thus, in some embodiments tubing 702 (such as coiled tubing, or jointed pipe) is used. In particular, the wireline or cable is placed in operational relationship to the tubing (e.g., within the internal diameter), and thus force to move the tool 700 into horizontal portions may be supplied at the surface. In yet still other cases, the tool 700 may itself implement a physical system to move within the horizontal portions. Regardless of the mechanism to transfer the tool 700 within the horizontal portions, the cable communicatively couples the tool 700 to surface equipment 704. Like the LWD tools, the wireline tool 700 interrogates a volume 710 around the tool, and different tools may interrogate different volumes during the process of refining the drilling direction. The types of measurements that may be made with tool 700 are the same as those discussed with respect to the LWD tools discussed above.

While the various embodiments of refining drilling direction to intersect the flow path 300 of the leak have been in relation to LWD and wireline tools, the logging methods are not limited to LWD and wireline, as other logging techniques may be additionally or equivalently used. For example, in some embodiments may additionally use what is termed "mud logging" to help refine drilling direction. In one aspect of mud logging, the drilling fluid that returns to the surface is analyzed to determine the presence of components that entered the drilling fluid down hole. For example, if the fluid escaping along the flow path 300 is carbon dioxide, an increase in carbon dioxide in the drilling fluid that returns to surface would confirm that the second borehole 400 has intersected the flow path 300. Similar analysis may be performed for any fluid escaping along the flow path 300.

As yet another example, the cuttings that are carried to the surface in the drilling fluid can be analyzed to determine their mineralogical and/or elemental content. If the flow path 300 of the leak resides within a known type of rock (e.g., known based on previous seismic work in the area or survey wells), when analysis of the cuttings show an increase in the type of rock through which the flow path 300 is known to reside, such may indicate that the second borehole 400 has intersected the flow path 300. Use of logging devices and systems as described is merely illustrative, and one of ordinary skill, now understanding the goal of intersection for purposes of remediating a leak between subterranean zones, could select a suite of logging tools to refine the direction of the intersecting borehole based on the particular situation presented.

Returning to FIG. 5, once the second borehole 500 has intersected the flow path 300, in accordance with the various embodiments a sealing compound is placed in the flow path 300 through borehole 500. The compound may be any of the various compounds discussed above, as well as combinations thereof.

With respect to making measurements of surface deformation, the various embodiments discussed to this point have relied, at least in part, on surface-based devices such GPS-based elevation measurements, and inclinometer-based measurements. Moreover, the InSAR-based readings again produce an indication of changes in surface elevation. However, making a reading indicative of surface deformation in accordance with the various embodiments is not limited to just readings that are directly indicative of surface deformation.

Figure 8:
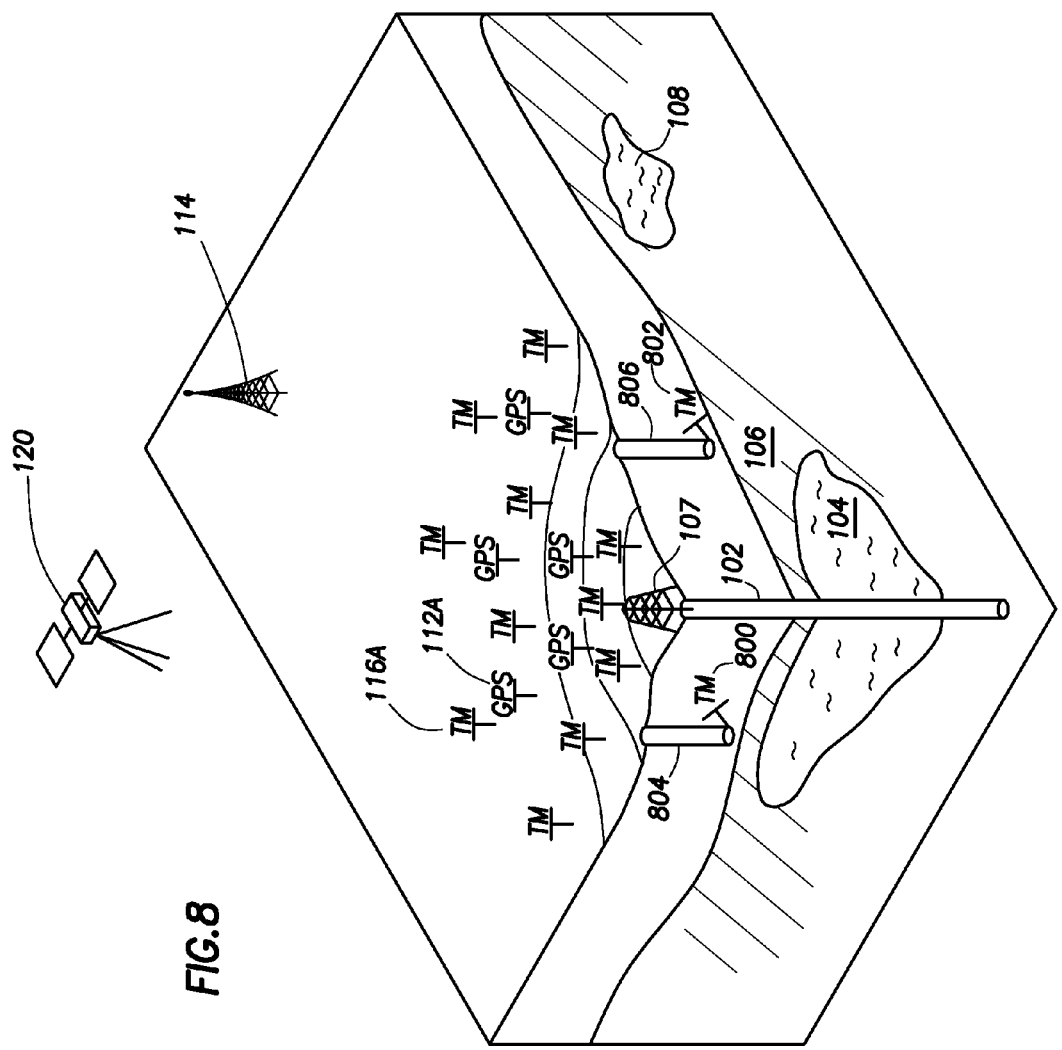
FIG. 8 shows a perspective cut-away view of a plurality of subterranean zones and related monitoring equipment, including at least some monitoring equipment within boreholes, in accordance with at least some embodiments.

In accordance with at least some embodiments, measurements may be taken in other locations, such as within boreholes proximate to the subterranean zone, but in some cases closer to the subterranean zone than the surface. In particular, FIG. 8 shows a system similar to that of FIG. 2, but where in addition to surface-based measurement devices 112 and 116, the system further includes a plurality of sub-surface measurement devices 800 and 802. More particularly still, in accordance with at least some embodiments, inclinometer-based measurement devices 800 and 802 may be placed in respective boreholes 804 and 806. Illustrative boreholes 804 and 806 may take many forms. In some cases the boreholes 804 and 806 are dedicated monitoring boreholes drilled specifically for monitoring the subterranean zone 104, such as for permanently or semi-permanently installed seismic sensors. In yet still other cases, the boreholes 804 and 806 may be active and/or abandoned hydrocarbon producing wells. Regardless of the precise nature of the boreholes 804 and 806, in some embodiments inclinometers are placed within the boreholes closer to the subterranean zone. In this way, the inclinometer-based measurements are more sensitive to the location of the injected fluid plume, and leaks, yet such measurements are still indicative of surface deformation. Deformation information for all the measurement devices may be combined when determining whether a leak from the subterranean zone 104 exists, and/or the direction of the leak.

Figure 9:
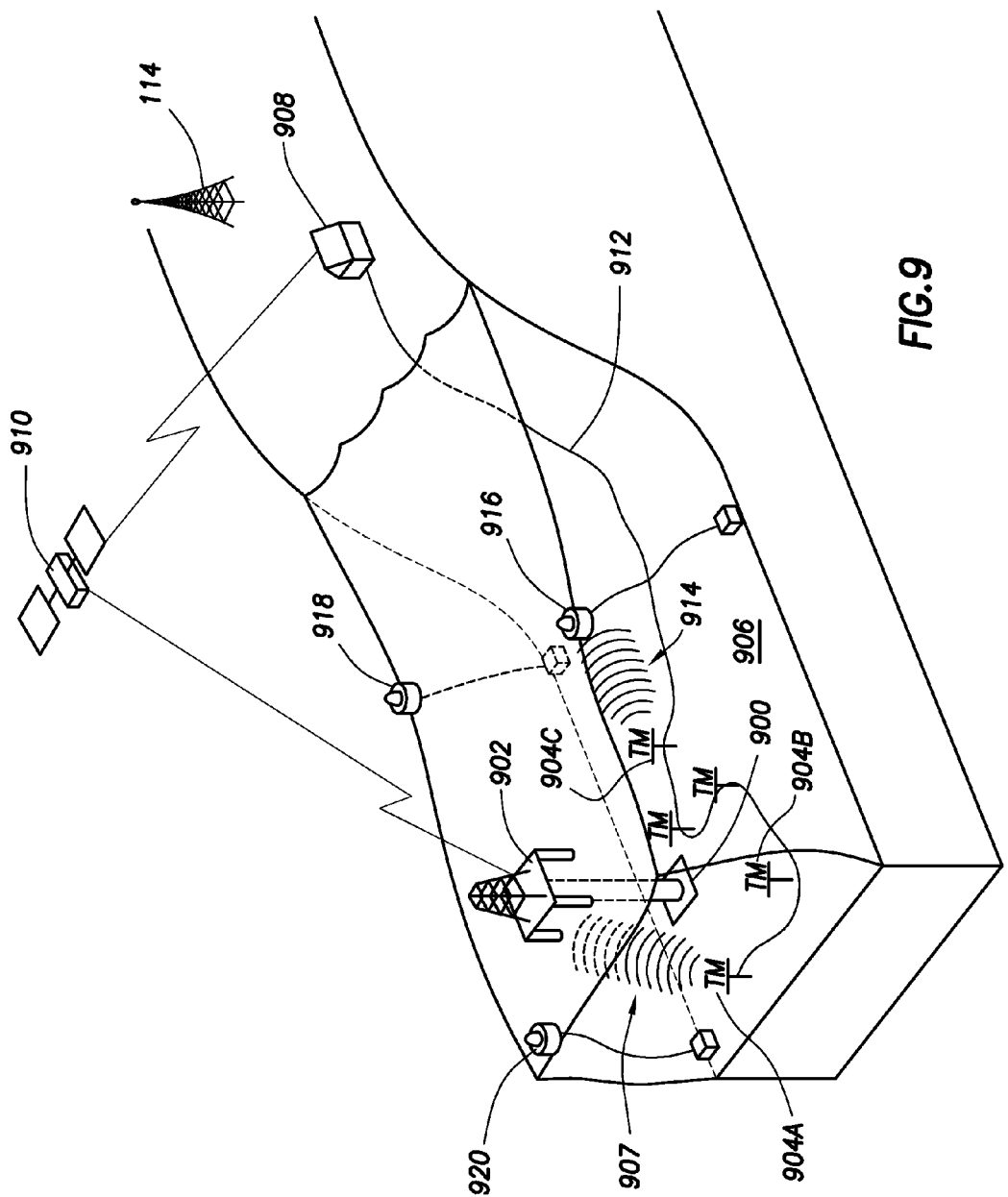
FIG. 9 shows a perspective cut-away view of an off-shore system and related monitoring equipment, in accordance with at least some embodiments.

The various embodiments to this point have been in reference to observing surface deformation of a non-submerged surface; however, the various embodiments are also applicable to offshore operations. FIG. 9 shows a perspective cut-away view of an offshore hydrocarbon field in order to explain concepts used in the various embodiments. In particular, FIG. 9 shows well head 900 associated with a borehole (not specifically shown). The well head 900 is illustratively associated with a floating vessel illustratively shown as a platform 902. In the case of a completed well, the platform 902 could be a production platform, or in more active fields the platform 902 may be a drilling platform.

Like the land-based systems, a plurality of deformation measurement devices 904 (three such devices labeled 904A, 904B and 904C, but additional devices shown but not numbered) in the form of inclinometer-based measurements (again labeled TM for "tilt meter") are placed proximate to the seabed 906. For purposes of this disclosure and the claims the seabed 906 is the surface of the earth that is covered with water. From a technological basis, the measurement devices 904 may be the same as their land-based brethren, but sealed in waterproof and pressure resistant containers. The measurement devices 904 may be placed proximate the seabed 906 in any suitable manner, such as by trenching, suction anchors, gravity deployed anchors, within holes created by remotely operated vehicles (ROVs) by way of an auger, or weighted systems. In some cases, the inclinometer-based measurements may be made at the seabed 906, and in yet other case the measurement devices 904 may be slightly above the seabed 906 with an anchor in some form extending down into the seabed 904. Further still, the measurement devices 904 may be buried some distance (within 20 to 40 feet of the seabed), yet still be considered proximate to the surface.

Communication between the measurement devices 904 and the computer system which makes surface deformation determinations may take many forms. For example, the measurement devices may be equipped with acoustic transmission devices which enable each measurement device to periodically (e.g., minutely, hourly, daily, or change driven) send its respective measurement to an acoustic receiver, such as an acoustic receiver on the platform 902. The acoustic communication with the platform is illustrated by acoustic waves 907 emanating from measurement device 904A. A computer system on the platform 902 in turn, makes the surface deformation determinations, or the computer system sends the data to a land-based station 908, such as by way of satellite 910. In other cases, the measurement devices may be communicatively coupled to the land-based station 908 by a communication cable 912. The communication cable may take any suitable form, such as a fiber-optic cable, electrical conductors, or combinations. In a particular embodiment, the measurement devices 904 are disposed within the communication cable such that deployment of the communication cable 912 likewise deploys the measurement devices 904.

Communication of measured values is not limited to acoustic communication with a platform or over a communication cable. In other embodiments, the measurement devices may acoustically communicate with any suitable vessel floating at or near the top of water. For example, measurement device 904C is illustratively shown acoustically communicating (by way of acoustic waves 914) with buoy 916. Illustrative buoy 916 may forward the readings using any suitable system, such as point-to-point electromagnetic wave communication, a cellular system, or communications using satellite 910.

For relatively shallow subterranean zones and/or short term measurement of surface deformation (e.g., hours, days, a few months), placing a plurality of inclinometer-based measurement devices 904 at approximately known positions may be sufficient to determine surface deformation. However, for deeper subterranean zones and/or longer term measurements (e.g., months, years), position of the measurement devices may need to be known. However, because GPS signals cannot penetrate the water, direct GPS-based positioning of the measurement devices is not available. Several underwater positioning systems may be used to obtain position with varying degrees of precision. Example positioning systems are discussed next.

One such underwater positioning system uses acoustic waves propagated through the water above the seabed 904. In particular, an acoustic transmitter may be placed at a base location (e.g., the wellhead 900). The transmitter may launch acoustic waves that propagate through the water to the measurement devices 904. In some embodiments, each measurement device 904 may be arranged to be or have an acoustic reflector. The acoustic wave reflects from the reflective portion of the measurement device, and is received back at the base location. Based on the round trip time for the acoustic wave and the speed at which acoustic waves travel through the water (as a function of temperature, salinity), a distance between the base location and each measurement device 904 may be determined. In cases where the base location has an array of receivers, a relative bearing from the location of the base station to the measurement device may also be determined. In this illustrative case, once an initial distance/bearing is determined, surface deformation may change the slant-range distance and/or bearing between the base location and the measurement device. Thus, changes in slant-range distance and/or bearing, possibly in combination with changes in incline at the measurement device, are indicative of surface deformation at the location.

In other cases, each measurement device has a receiver to receive the electromagnetic wave. Based on arrival time of the electromagnetic wave, and possibly data encoded in the electromagnetic wave (e.g., the precise time the electromagnetic wave was launched), the measurement device itself may determine a precise distance between the base station and the measurement device. The measurement device 904 may provide the distance determined through other communication means, such as through acoustic communication with a floating vessel (e.g., platform 902, or buoy 916), where computers on the floating vessel may utilize the information, or forward the information to land-based station 908. Further still, in the case of measurement devices communicatively coupled to the land-based station 908 by way of a communication cable, the distance information may be forwarded by way of the communicative coupling.

Another illustrative underwater positioning system uses acoustic waves propagated through the seabed 904. In particular, an acoustic transmitter may be placed at a base location (e.g., the wellhead 900). The acoustic transmitter may launch acoustic waves that propagate through the seabed to the measurement devices 904. In some embodiments, each measurement device 904 may include a seismic detector. The acoustic wave is detected by the seismic detector, and based on arrival time of the acoustic wave at the measurement device, a precise distance between the base location and the measurement device 904 may be determined. In some cases, the measurement device 904 itself may make the distance determination, but in other cases acoustic wave arrival time information is forwarded (e.g., through an acoustic system to a floating vessel, or through a communicative coupling by way of a cable) to one or more other computer systems for making the distance determination. Once an initial distance between the base location and the measurement device is determined, surface deformation may change the slant-range distance between the base location and the measurement device. Thus, changes in slant-range distance, possibly in combination with changes in incline at the measurement device, are indicative of surface deformation at the location.

Another underwater positioning system uses electromagnetic waves propagated through the seabed. In particular, an electromagnetic transmitter may be placed at a base location (e.g., the wellhead 900). The transmitter may launch electromagnetic waves that propagate through the seabed 906 to the measurement devices 904. In some embodiments, a measurement device 904 may include an electromagnetic reflector. The electromagnetic wave reflects from the reflector and is received back at the base location. Based on the round trip time for the electromagnetic wave and the speed at which electromagnetic waves travel through the sediment of the seabed, a precise distance between the base location and each measurement device 904 may be determined. In this illustrative case, once an initial distance is determined surface deformation may change the slant-range distance between the base location and the measurement device. Thus, changes in slant-rage distance, possibly in combination with changes in incline at the measurement device, are indicative of surface deformation at the location.

In other cases, each measurement device has an acoustic receiver to receive the acoustic positioning signal. In some embodiments, the acoustic receiver for distance measurement may also be used in bi-directional acoustic communication with one or more floating vessels. Based on arrival time of the acoustic wave, and possibly data encoded in the acoustic wave (e.g., the precise time the acoustic wave was launched), the measurement device itself may determine a precise distance between the base station and the measurement device. The measurement device 904 may provide the distance determined to other devices through other communication means, such as through acoustic communication with a floating vessel (e.g., platform 902, or buoy 916), where computers on the floating vessel may utilize the information, or forward the information to land-based station 908. Further still, in the case of measurement devices communicatively coupled to the land-based station 908 by way of a communication cable, the distance information may be forwarded by way of the communicative coupling.

Still referring to FIG. 9, in accordance with yet still other embodiments, position (including an elevation) may be determined using a plurality of floating vessels. In particular, each illustrative floating vessel in FIG. 9 (i.e., platform 902, and buoys 916, 918, and 920) may determine their respective real-time geospatial position (including elevation) based on signals received from GPS satellites and land-based station 114 and/or terrestrial radio systems used for position determination. Each floating vessel, in turn, may acoustically broadcast a timing signal and position information to the measurement devices 904. The measurement devices, receiving the plurality (e.g., four or more) acoustic signals from the floating vessels may determine a precise geospatial location. That is, taking into account relative arrival time of the signal from each floating vessel, position of each floating vessel when the acoustic signal was launched (embedded in the acoustic signal), and the speed of sound in the water, each measurement device may calculate a geospatial location (including elevation).

With respect to the floating vessels, once a device has "locked" to a series of GPS satellite signals, calculating position may occur very quickly (tens of milliseconds or less). Thus, in calm seas very little change in absolute elevation of a floating vessel may occur between determining position (and elevation), and acoustically broadcasting the position to the measurement devices 904. However, in high seas, position of the floating vessel may change rapidly, making the determination of position by the measurement devices less accurate. Moreover, in extremely high seas, reception of GPS signals from satellites near the horizon may be sporadic, adversely affecting the ability of the measurement devices 904 to determine position. However, since surface deformation is a relatively slow process, the presence of a surface deformation may be made based on data spanning days, weeks, or months, a temporary inability to precisely calculating position because of high seas does not render the system unusable.

In the case of surface deformation for a surface covered by water, InSar measurements may not be available. However, an inability to use an InSAR-type system may be compensated for by the increased numbers of measurement devices, or installation of additional devices when a leak is determined. For example, if an offshore carbon dioxide sequestration operation starts to show subsidence, a leak may be assumed and thus additional (possibly temporary) measurement devices may be installed to identify the direction the leak is proceeding.

Once a flow path out of an offshore subterranean zone is determined, any of the remediation techniques described above may used, including in appropriate circumstances using drilling platforms to drill new boreholes to intersect the flow pathway. However, given the high cost of drilling additional boreholes, in many situations remediation through existing boreholes (whether hydrocarbon producing or for injection of secondary recovery fluids) will be chosen.

Figure 10:
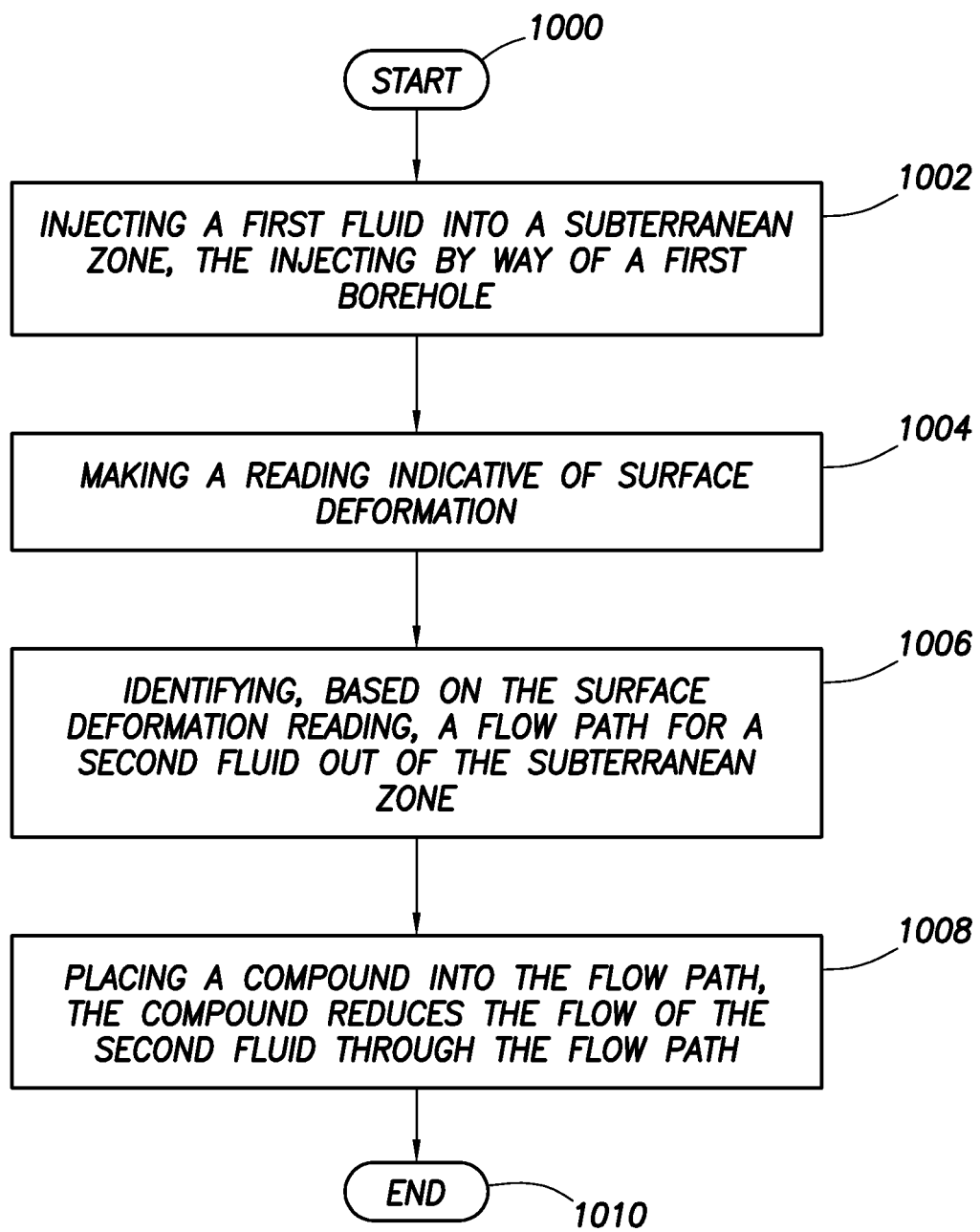
FIG. 10 shows a method in accordance with at least some embodiments.

FIG. 10 illustrates a method in accordance with at least some embodiments. In particular, the method starts (block 1000) and proceeds to: injecting a first fluid into a subterranean zone, the injecting by way of a first borehole (block 1002); making a reading indicative of surface deformation (block 1004); identifying, based on the surface deformation reading, a flow path for a second fluid out of the subterranean zone (block 1006); and placing a compound into the flow path, the compound reduces the flow of the second fluid through the flow path (block 1010). Thereafter, the method ends (block 1012).

The above discussion is meant to be illustrative of the principles and various embodiments of the present invention. Numerous variations and modifications will become apparent to those skilled in the art once the above disclosure is fully appreciated. For example, while discussed in terms of sequestration of carbon dioxide, the identification of leaks using surface deformation, and sealing the leak may be used for any type of sequestration, as well for non-sequestration uses such as secondary recovery techniques that inject any suitable fluid, such as steam, carbon dioxide, water, nitrogen, natural gas, waste water and/or air. Further still, while the various embodiments rely on measures of surface deformation, such measures can be augmented by other data, such as real-time temperature and pressure data from wells instrumented with sensors connected to fiber optic cables, geophones and/or accelerometers (e.g., "listening" for leaks and/or leak paths), and in the case of offshore installations pressure sensors sensing depth. It is intended that the following claims be interpreted to embrace all such variations and modifications.

What is claimed:

1. A method comprising:
injecting a first fluid into a first subterranean zone, the injecting by way of a first borehole; and then
making a reading indicative of surface deformation;
identifying, based on the reading indicative of surface deformation, a flow path for a second fluid out of the first subterranean zone to a second subterranean zone, the second subterranean zone distinct from the first subterranean zone, and the flow path not including the first borehole; and
placing a compound into the flow path at a location between the first subterranean zone and the second subterranean zone, the compound reduces the flow of the second fluid through the flow path.

2. The method of claim 1 wherein placing the compound further comprises injecting the compound through a borehole, wherein the compound is configured to chemically react and thereby reduce flow of the second fluid.

3. The method of claim 2 wherein injecting the compound through the borehole further comprises at least one selected from the group consisting of:
injecting through a borehole designated for injection of secondary recovery fluids;
injecting through a borehole designated for hydrocarbon extraction; and injecting through a borehole drilled to intersect the flow path.

4. The method of claim 1 wherein injecting the first fluid further comprises sequestering carbon dioxide in the subterranean zone.

5. The method of claim 1 wherein injecting the first fluid further comprises injecting the first fluid to increase hydrocarbon production from the subterranean zone.

6. The method of claim 5 wherein injecting the first fluid further comprises injecting at least one selected from the group consisting of: steam; carbon dioxide; water; and air.

7. The method of claim 1 wherein placing the sealing compound further comprises placing a compound that lodges within the flow path and thereby reduces flow of the second fluid.

8. The method of claim 7 wherein placing further comprises placing a compound that chemically reacts with the second fluid to viscosify into a reduced permeability mass.

9. The method of claim 1 wherein making a surface deformation reading further comprises making interferometric synthetic aperture radar measurements of surface elevation.

10. The method of claim 1 wherein making a surface deformation reading further comprises:
making global positioning system (GPS) based measurements of position of floating vessels; and
making position measurements of measurement devices disposed on a seabed, the position measurement based on signals broadcast by the floating vessels.

11. The method of claim 10 wherein making position measurements further comprises reading position of a plurality of inclinometers disposed at seabed.

12. The method of claim 1 wherein making a surface deformation reading further comprises taking readings from at least one inclinometer disposed within a borehole proximate the subterranean zone.

13. The method of claim 1 wherein making a surface deformation reading further comprises combining the readings from two or more measurement types to determine the surface deformation, the two or more measurement types selected from the group consisting of: global positioning system (GPS) based measurements of elevation of a plurality of floating vessels; acoustic-based position measurements of a plurality of measurement devices disposed on the seabed; and inclinometer-based measures of change in surface inclination.

14. A method comprising:
injecting a first fluid into a first subterranean zone, the injecting by way of a first borehole, and the first subterranean zone residing at least partially below a body of water disposed on a surface of the earth; and then
making a reading indicative of deformation of a portion of a seabed above the first subterranean zone;
identifying, based on the reading indicative of deformation, a flow path for a second fluid out of the first subterranean zone to a second subterranean zone, the second subterranean zone distinct from the first subterranean zone, and the flow path other than the first borehole; and
placing a compound into the flow path at a location between the first subterranean zone and the second subterranean zone, the sealing compound reduces the flow of the second fluid through the flow path.

15. The method of claim 14 wherein injecting the first fluid further comprises sequestering carbon dioxide in the subterranean zone.

16. The method of claim 14 wherein injecting the first fluid further comprises injecting the first fluid to increase hydrocarbon production from the subterranean zone.

17. The method of claim 14 wherein making a reading indicative of deformation of the surface further comprises:
making global positioning system (GPS) based measurements of position of a plurality of floating vessels; and
making position measurements of a plurality of measurement devices disposed on the seabed, the position measurement utilizing the floating vessels.

18. The method of claim 17 wherein making position measurements further comprises reading position of a plurality of inclinometers disposed at seabed.

19. The method of claim 17 wherein making position measurements further comprises making position measurements using acoustic signals propagated through the water between the plurality of floating vessels and the measurement devices.

* * * * *